United States Patent Office 3,000,906
Patented Sept. 19, 1961

3,000,906
PURIFICATION OF PIVALOLACTONE
Robert H. Hasek and Ronald G. Nations, Kingsport, Tenn., assignors to Eastman Kodak Company, Rochester, N.Y., a corporation of New Jersey
No Drawing. Filed Feb. 5, 1960, Ser. No. 6,887
3 Claims. (Cl. 260—343.9)

This invention relates to the preparation of pivalolactone, and more particularly, to the purification of pivalolactone compositions containing dimethylketene dimer.

Pivalolactone, also called 2,2-dimethylhydacrylic acid β-lactone, is a well-known intermediate useful in the preparation of polyesters and polyamides, reference being made to British Patent No. 766, 347 and U. S. Patent No. 2,500,317. Pivalolactone can be prepared by reacting dimethylketene and formaldehyde by the methods described in U. S. Patent Nos. 2,356,459 and 2,424,590. This reaction can be represented by the following equation:

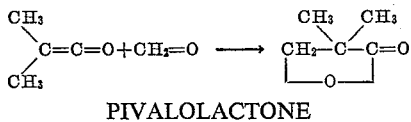

PIVALOLACTONE

The manufacture of pivalolactone by such a process is complicated by the formation of by-products which tend to foul the reactor or are difficult to separate from the pivalolactone. In practice, it is difficult to combine formaldehyde and dimethylketene in an exact one-to-one ratio and effect a complete addition of these two reactants without some concurrent polymerization thereof. If a slight excess of formaldehyde is metered into the reaction chamber, the system is fouled by the formation of solid paraformaldehyde on any relatively cool surfaces. It is preferred to avoid an excess of formaldehye for this reason, and employ a slight excess of dimethylketene. The uncombined excess dimethylketene dimerizes to form dimethylketene dimer, also called tetramethyl-1,3-cyclobutanedione. The formation of dimethylketene dimer can be represented by the following equation:

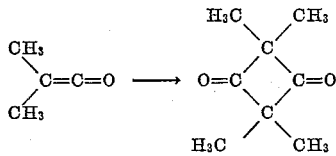

DIMETHYLKETENE DIMER

However, dimethylketene dimer has physical properties which match those of pivalolactone, and thus is an impurity that is difficult to separate from the pivalolactone product. The boiling points of pivalolactone and dimethylketene dimer are almost identical making distillation an impractical method of purification. Likewise, recrystallization and fractional freezing separation purification methods are not practical as dimethylketene dimer has a lower solubility in most solvents and a higher melting point than pivalolactone.

The presence of impurities in pivalolactone such as dimethylketene dimer are undesirable in many uses of pivalolactone. In the reaction of pivalolactone with ammonia to form aminopivalic acid, the reaction of dimethylketene dimer adds an undesirable impurity to the aminopivalic acid. For the preparation of a satisfactory polyamide, the aminopivalic acid must be quite pure, and extra effort must be expended to remove the impurity from the reaction product. Similarly, in the preparation of polyesters from pivalolactone, the lactone must be very pure. Hence, the presence of dimethylketene dimer in pivalolactone, such as results in the preparation of pivalolactone from dimethylketene and formaldehyde, is highly undesirable and a problem in the art.

It is an object of this invention to provide a new method for purifying pivalolactone.

It is another object of this invention to provide a practical method for separating dimethylketene dimer from pivalolactone.

It is likewise an object of this invention to provide a process of removing dimethylketene dimer from a reaction mixture containing pivalolactone and forming a useful and separable byproduct.

These and other objects of the invention are accomplished by hydrogenating a pivalolactone composition containing dimethylketene dimer, tetramethyl-1,3-cyclobutanedione, as an impurity in the presence of a hydrogenation catalyst of elemental ruthenium and thereby converting a substantial part of the dimethylketene dimer to the corresponding ketol, 3-hydroxy-2,2,4,4-tetramethylcyclobutanone, and/or the corresponding diol, 2,2,4,4-tetramethyl-1,3-cyclobutanediol, and thereafter separating pivalolactone from the 3-hydroxy-2,2,4,4-tetramethylcyclobutanone and/or the 2,2,4,4-tetramethylcyclobutane-1,3-diol in the resulting reaction mixture.

The pivalolactone composition in the present process is hydrogenated in the presence of an elemental ruthenium catalyst. The actual physical state of the catalyst can be widely varied in accordance with usual hydrogenation practice. Suitable catalysts are, for example: colloidal ruthenium; powdered ruthenium; ruthenium supported on powdered activated carbon or alumina; or ruthenium supported on pellets, granules, or extrusions of alumina or carbon. In general, a powdered catalyst would be used if the subject process were carried out batchwise and pelleted or granular catalysts would be used for continuous operation in a tower packed with catalyst.

The amount of catalyst employed can be widely varied in accordance with usual practice. In a batchwise operation the ruthenium catalyst is usually varied from about .01% to 10% based on the weight of the dimethylketene dimer impurity. In a continuous operation in a tower packed with supported catalysts the ratio of catalyst to the dimethylketene dimer, of course, is very much higher.

With regard to suitable reaction conditions under which the subject ruthenium catalysts are employed, temperatures up to about 100° C. are suitable, temperatures of about 0° C. to 100° C. are generally used, and temperatures of about 15° C. to 75° C. are preferably used. The hydrogen pressure utilized can also be varied over a wide range, with pressures up to about 500 atmospheres being suitable, and pressures from about 50 to 500 atmospheres being preferred. The subject hydrogenation is carried out until a substantial amount, and preferably substantially all, of the dimethylketene dimer impurity in the pivalolactone composition being treated is converted to 3-hydroxy-2,2,4,4-tetramethylcyclobutanone and/or 2,2,4,4 - tetramethyl - 1,3-cyclobutanediol. The time required to effect a substantially complete hydrogenation of the dimethylketene dimer varies with the above described reaction conditions, the physical form of the catalyst, the amount of dimethylketene dimer present and related reaction variables, with reaction times of about 30 minutes to 10 hours being commonly employed.

The subject hydrogenation can be carried out in the absence of an added solvent, the pivalolactone composition itself being a suitable liquid reaction medium. However, a solvent inert to the hydrogenation or to the reactants can be employed if desired. Suitable solvents include isopropyl alcohol, sec.-butyl alcohol and tert.-butyl alcohol.

After the pivalolactone composition containing the dimethylketene dimer impurity is hydrogenated to convert the dimethylketene dimer to 3-hydroxy-2,2,4,4-tetramethylcyclobutanone and/or 2,2,4,4-tetramethyl-1,3-cyclobutanediol the β-pivalolactone can be readily separated therefrom because of the substantial differences in physical properties between pivalolactone and 3-hydroxy-2,2,4,4-tetramethylcyclobutanone and/or 2,2,4,4-tetramethyl-1,3-cyclobutanediol. Distillation is a particularly effective separation method for separating the lower boiling pivalolactone from the subject ketol and/or diol in the hydrogenated reaction mixture. Conventional distillation techniques can be employed to effect this separation. Flash distillation is a suitable mode of separation, although some fractionation is desirably utilized for optimum separation of the pivalolactone. Likewise, chromatographic separation techniques can be utilized to separate the pivalolactone from the reaction mixture.

In the present process, the ruthenium catalyst is particularly tailored to the hydrogenation of dimethylketene dimer impurity in pivalolactone compositions. The action of the ruthenium catalyst is quite specific in the reduction of subject dimer impurity to the corresponding ketol and/or diol, the formation of substantially no by-products resulting during the course of this reaction, and this reduction reaction commonly proceeding in yields of 90% to 95% or higher. While elemental ruthenium is the highly useful catalyst in the present process, ruthenium oxide and ruthenium halides do not possess such usefulness. Likewise, Raney nickel catalysts which usually contain trace amounts of alkaline materials are undesirable as they promote the polymerization of the pivalolactone. Also, such conventional hydrogenation catalysts as the copper-chromium-oxide type are less effective than ruthenium in the present process. Further, the catalyst of the invention can be effectively utilized at relatively low temperatures and polymerization of the pivalolactone thus minimized. Many conventional hydrogenation catalysts are not effective at low temperatures. In essence, a catalyst of elemental ruthenium is particularly adapted for the hydrogenation of a pivalolactone composition containing dimethylketene dimer as an impurity as this catalyst efficiently converts this dimer to the corresponding diol with a minimum of side effects.

The invention is illustrated by the following examples of preferred embodiments thereof.

*Example 1*

Into a 2 liter flask was placed 1 gram of anhydrous zinc chloride and 100 g. of ethyl acetate. Thereafter dimethylketene and formaldehyde gas were passed simultaneously into the reaction flask in approximately equimolar amounts with a slight excess of dimethylketene. The reaction mixture was stirred vigorously and the temperature was maintained at about 35° C. by means of an ice bath around the reaction flask. The dimethylketene and the formaldehyde were added for about 5 hours, and then the reaction mixture was washed with an aqueous solution of potassium carbonate, filtered and washed with water. About 700 g. of a crude pivalolactone composition containing a substantial amount of dimethylketene dimer as an impurity was obtained.

*Example 2*

A pivalolactone composition prepared by the method described in Example 1 was subjected to fractional distillation with a jacketed distillation column 1 inch in diameter and 48 inches long that was packed with Podbielniak "Helipak." The reflux ratio of the fractional distillation was 9 to 1. A center cut fraction having a boiling range of 47.9° to 49.5° C. under a pressure of 11 mm. of mercury was collected. Analysis of this fraction by gas chromatography indicated 91% pivalolactone, 5.4% dimethylketene dimer, and the remainder a mixture of ethyl acetate, isobutyric acid and isobutyric anhydride. The collected center cut fraction was further subjected to distillation and several fractions were taken and analyzed by gas chromatography. The results of this second fractional distillation are summarized by the data set out in Table 1 below. In Table 1, the pivalolactone is represented as "Lactone," and dimethylketene dimer is represented as "Dimer."

TABLE 1

| Fraction | Boiling Point, °C. | Pressure, mm. Hg | Volume, ml. | Analysis by Gas Chromatog., Percent | | | Freezing Point, °C. |
|---|---|---|---|---|---|---|---|
| | | | | Low Boilers | Lactone | Dimer | |
| 1 | 50–52.5 | 15 | 50 | 6.0 | 83.8 | 10.2 | |
| 2 | 52.5–53.5 | 15 | 100 | 1.1 | 87.2 | 11.7 | −18.56 |
| 3 | 53.5 | 15 | 97 | 0.4 | 92.6 | 7.0 | |
| 4 | 53.5 | 15 | 102 | 0.2 | 94.5 | 5.3 | −17.01 |
| 5 | 51.0 | 14 | 101 | 0.7 | 94.1 | 5.2 | |
| 6 | 50.0 | 13 | 100 | 1.4 | 90.7 | 7.9 | −15.07 |
| 7 | 53.0 | 15 | 100 | 1.2 | 95.2 | 3.6 | |
| 8 | 53.0 | 15 | 101 | 0.3 | 96.8 | 2.9 | −13.82 |
| 9 | 53.0 | 15 | 102 | 0.2 | 99.0 | 0.8 | −13.40 |
| 10 | 53.0 | 15 | 102 | 0.3 | 98.8 | 0.9 | −13.12 |
| 11 | 53.0 | 15 | 100 | 0.2 | 99.3 | 0.5 | −12.92 |
| 12 | 53.0 | 15 | 81 | 0.3 | 98.5 | 1.2 | −12.82 |

The above fractional distillations illustrate the extreme difficulty of separating pivalolactone from dimethylketene dimer by fractional distillation. Fractions 3 to 9 of Table 1 (contained about 95% β-pivalolactone and about 4.5% dimethylketene dimer) were placed in a high pressure, rocking-type autoclave and hydrogenated in the presence of 150 grams of 5% elemental ruthenium on powdered alumina. The hydrogenation was carried out for one hour at 3,000 p.s.i. and at 26° C. After removal of the catalyst by filtration, the hydrogenation product was examined by gas chromatography with no trace of dimethylketene dimer, this dimer having been converted to 2,2,4,4-tetramethyl-1,3-cyclobutanediol. A portion of the hydrogenation product was then distilled to separate pivalolactone, B.P. 53.5° C. (15 mm. of mercury), $n_D^{20}$ 1.4085, and a freezing point of −13.00° C.

*Example 3*

A 1620 ml. sample of a crude pivalolactone composition prepared by the method described in Example 1 was hydrogenated over 100 g. of 5% elemental ruthenium on powdered alumina under a pressure of 5,000 p.s.i. at 50° C. for 6 hours. The removal of the dimethylketene dimer, from the crude pivalolactone, as shown by gas chromatographic analysis, was complete. Table 2 below summarizes the make-up of the pivalolactone composition before and after the hydrogenation.

TABLE 2

| Component | Crude Pivalolactone, percent | Hydrogenated Product, percent |
|---|---|---|
| Low-boiling components | 16.4 | 17.2 |
| Dimethylketene dimer | 4.0 | 0.0 |
| β-pivalolactone | 67.0 | 64.2 |
| Isobutyric acid | 10.4 | 9.8 |
| Unknown high-boiling component | 2.2 | 4.0 |
| 3-Hydroxy-2,2,4,4-tetramethylcyclobutanone | 0.0 | 3.3 |
| 2,2,4,4-tetramethyl-1,3-cyclobutanediol | 0.0 | 1.5 |

Pure pivalolactone boiling 53.5° C. (15 mm. of mercury) is readily separated from the described hydrogenation mixture of distillation in the distillation column described in Example 2.

Example 4

Crude pivalolactone was passed downward, concurrently with a stream of hydrogen through a stainless steel tubular autoclave, 1.8 in. i.d. x 30 in. long, packed with 1171 g. (1240 ml.) of ruthenium catalyst, consisting of 1% ruthenium metal on 10–24 mesh alumina support. Thermocouples were placed in a well in the middle of the tube, and located to measure the temperatures in the catalyst bed 7.5, 15, and 22.5 inches down from the top of the bed. The product was collected in a gas-liquid separator, and the liquid product was discharged through a valve controlled by the liquid level in the separator. The crude pivalolactone was pumped through this continuous hydrogenation system until composition of the hydrogenation product was constant. Two-liter charges of the crude pivalolactone were then processed under different conditions and the corresponding products were analyzed by gas chromatography. The results of this work are shown in the following table (Table 3). Pertinent analyses included are pivalolactone (lactone), tetramethyl-1,3-cyclobutanedione (dimer), 3-hydroxy-2,2,4,4-tetramethylcyclobutanone (ketol), and 2,2,4,4-tetramethyl-1,3-cyclobutanediol (diol). Materials not accounted for by the analyses were impurities in the crude pivalolactone (for example, isobutyric acid) which were unchanged by the hydrogenation. Pivalolactone is then readily separated from the ketol and the diol hydrogenation products by distillation in the distillation column described in Example 2.

TABLE 3.—CONTINUOUS HYDROGENATION OF CRUDE PIVALOLACTONE

| Sample | Rate, ml./min. | Hydrogen Press., p.s.i. | Maximum Temp., °C. | Volume of Product, ml. | Analyses | | | |
|---|---|---|---|---|---|---|---|---|
| | | | | | Lactone | Dimer | Ketol | Diol |
| Crude pivalolactone | | | | | 61.2 | 11.7 | 0 | 0 |
| 1 | 5 | 1,000 | 40 | 1,980 | 52.8 | 1.8 | 7.1 | 1.8 |
| 2 | 5 | 2,000 | 39 | 1,970 | 56.8 | 1.8 | 5.4 | 2.7 |
| 3 | 5 | 4,000 | 43 | 1,950 | 66.1 | 1.0 | 5.7 | 3.5 |
| 4 | 10 | 4,000 | 50 | 1,940 | 59.7 | 1.8 | 5.6 | 3.5 |

The present invention thus provides a simple and useful method for purifying pivalolactone containing dimethylketene dimer. Further, one of the by-products of the present process, 2,2,4,4-tetramethyl-1,3-cyclobutanediol, is a useful commercial chemical and the other by-product, 3-hydroxy-2,2,4,4-tetramethylcyclobutane, can be converted to this useful diol by further hydrogenation. Esters of this diol are useful plasticizers for plasticizing resins including polyvinyl chloride and cellulosic esters such as cellulose acetate and cellulose acetate butyrate.

Although the invention has been described in detail with reference to certain preferred embodiments thereof, it will be understood that variations and modifications can be effected within the spirit and scope of the invention as described hereinabove and as defined in the appended claims.

We claim:
1. A method of purifying pivalolactone compositions resulting from the reaction of dimethylketene and formaldehyde and containing tetramethyl-1,3-cyclobutanedione as an impurity which comprises hydrogenating said pivalolactone composition in the presence of a hydrogenation catalyst consisting essentially of elemental ruthenium at a temperature up to about 100° C. and thereby converting a substantial proportion of said tetramethyl-1,3-cyclobutanedione to a hydrogenated dione selected from the group consisting of 3-hydroxy-2,2,4,4-tetramethyl-cyclobutanone, 2,2,4,4-tetramethyl-1,3-cyclobutanediol and mixtures thereof, and thereafter separating pivalolactone from said hydrogenated dione in the resulting reaction mixture.

2. A method of purifying pivalolactone compositions resulting from the reaction of dimethylketene and formaldehyde and containing tetramethyl-1,3-cyclobutanedione as an impurity which comprises hydrogenating said pivalolactone composition in the presence of a hydrogenation catalyst consisting essentially of elemental ruthenium at a temperature of about 0° C. to 100° C. at pressures up to about 500 atmospheres and thereby converting substantially all of said tetramethyl-1,3-cyclobutanedione to a hydrogenated dione selected from the group consisting of 3-hydroxy-2,2,4,4-tetramethylcyclobutanone, 2,2,4,4-tetramethyl-1,3-cyclobutanediol and mixtures thereof, and thereafter subjecting the resulting reaction mixture to distillation and thereby separating pivalolactone from said hydrogenated dione.

3. In the purification of pivalolactone compositions resulting from the reaction of dimethylketene and formaldehyde and containing tetramethyl-1,3-cyclobutanedione as an impurity, the process which comprises hydrogenating said pivalolactone composition in the presence of a hydrogenation catalyst consisting essentially of elemental ruthenium on powdered alumina at a temperature of about 15° C. to 75° C. at a pressure of about 50 to 500 atmospheres and thereby converting substantially all of said tetramethyl-1,3-cyclobutanedione to a hydrogenated dione selected from the group consisting of 3-hydroxy-2,2,4,4-tetramethylcyclobutanone, 2,2,4,4-tetramethyl-1,3-cyclobutanediol and mixtures thereof, and thereafter subjecting the resulting reaction mixture to distillation to separate pivalolactone from said hydrogenated dione.

No references cited.